US009860869B2

(12) United States Patent
Kim et al.

(10) Patent No.: US 9,860,869 B2
(45) Date of Patent: Jan. 2, 2018

(54) METHOD AND APPARATUS FOR OFFLOADING DATA TRAFFIC IN A WIRELESS COMMUNICATION SYSTEM

(71) Applicants: Samsung Electronics Co., Ltd., Gyeonggi-do (KR); Korea University of Technology and Education Idustry—University Cooperation Foundation, Chungcheongnam-do (KR)

(72) Inventors: Min Kim, Seoul (KR); Yong-Hwan Kim, Chungcheongnam-do (KR); Youn-Hee Han, Chungcheongnam-do (KR); Sang-Jun Moon, Gyeonggi-do (KR); Yong-Seok Park, Seoul (KR); Jin-Ho Lee, Seoul (KR); Dae-Kyu Choi, Gyeonggi-do (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 625 days.

(21) Appl. No.: 14/318,434

(22) Filed: Jun. 27, 2014

(65) Prior Publication Data

US 2015/0003314 A1 Jan. 1, 2015

(30) Foreign Application Priority Data

Jun. 27, 2013 (KR) .................... 10-2013-0074151

(51) Int. Cl.
*H04W 28/00* (2009.01)
*H04W 68/02* (2009.01)
(Continued)

(52) U.S. Cl.
CPC ........... *H04W 68/02* (2013.01); *H04W 28/08* (2013.01); *H04W 76/00* (2013.01)

(58) Field of Classification Search
CPC ..................................... H04W 4/005
See application file for complete search history.

(56) References Cited

U.S. PATENT DOCUMENTS 8,031,672 B2 * 10/2011 Balaji ................ H04L 63/0428
370/331
8,837,408 B2 * 9/2014 Sun ....................... H04W 72/04
370/242
(Continued)

FOREIGN PATENT DOCUMENTS

KR 10-2009-0060583 6/2009

OTHER PUBLICATIONS

International Search Report dated Sep. 29, 2014 in connection with International Application No. PCT/KR2014/005641; 3 pages.
(Continued)

*Primary Examiner* — Ricky Ngo
*Assistant Examiner* — Dewanda Samuel (57) ABSTRACT

Provided is a method for offloading data traffic by a Mobility Management Entity (MME) in a wireless communication system. The method includes determining a Packet Data Network (PDN) to connect to for providing a service requested by a User Equipment (UE), upon receiving a connection request message requesting connection between the UE and the PDN from the UE, selecting a gateway disposed closest to a Radio Access Network (RAN), sending a permit message permitting a request for connection between the UE and the PDN to the UE, and setting an Evolved Packet Service (EPS) bearer for transmission and reception of data traffic related to a service requested by the UE between the UE and the gateway.

20 Claims, 9 Drawing Sheets

(51) Int. Cl.
*H04W 28/08* (2009.01)
*H04W 76/00* (2009.01)

(56) References Cited

U.S. PATENT DOCUMENTS

| | | | | |
|---|---|---|---|---|
| 2003/0235168 A1* | 12/2003 | Sharma | ............... | H04L 12/5602 370/338 |
| 2009/0129342 A1* | 5/2009 | Hwang | ............. | H04W 36/0022 370/331 |
| 2009/0161575 A1* | 6/2009 | Zhao | ................... | H04L 12/5692 370/254 |
| 2009/0239526 A1* | 9/2009 | Zhao | .................... | H04W 60/06 455/424 |
| 2009/0285179 A1* | 11/2009 | Jones | .................... | H04W 28/08 370/331 |
| 2010/0271949 A1 | 10/2010 | Yoon et al. | | |
| 2011/0045834 A1 | 2/2011 | Kim et al. | | |
| 2011/0058479 A1 | 3/2011 | Chowdhury | | |
| 2011/0116469 A1 | 5/2011 | Bi et al. | | |
| 2011/0222511 A1* | 9/2011 | Weng | ................... | H04L 41/085 370/331 |
| 2012/0063437 A1* | 3/2012 | Liang | .................... | H04W 8/082 370/338 |
| 2012/0082029 A1* | 4/2012 | Liao | .................... | H04W 76/025 370/230 |
| 2012/0084449 A1 | 4/2012 | Delos Reyes et al. | | |
| 2012/0135713 A1* | 5/2012 | Lee | ........................ | H04W 8/02 455/411 |
| 2012/0202491 A1* | 8/2012 | Fox | ....................... | H04B 7/2609 455/435.1 |
| 2013/0201924 A1* | 8/2013 | Song | .................... | H04W 76/02 370/329 |
| 2014/0189790 A1* | 7/2014 | Mindler | ................. | H04L 67/02 726/3 |

OTHER PUBLICATIONS

Written Opinion of International Searching Authority dated Sep. 29, 2014 in connection with International Application No. PCT/KR2014/005641; 5 pages.

3GPP: TSGSSA; "Local IP Access and Selected IP Traffic Offload (LIPA-SIPTO)"; 3GPP TR 23.829; V10.0.0; Mar. 2011; 43 pages.

* cited by examiner

METHOD AND APPARATUS FOR OFFLOADING DATA TRAFFIC IN A WIRELESS COMMUNICATION SYSTEM

CROSS-REFERENCE TO RELATED APPLICATION(S) AND CLAIM OF PRIORITY

The present application is related to and claims priority under 35 U.S.C. §119(a) to Korean Patent Application Serial No. 10-2013-0074151, which was filed in the Korean Intellectual Property Office on Jun. 27, 2013, the entire disclosure of which is hereby incorporated by reference.

TECHNICAL FIELD

The present disclosure generally relates to a method and apparatus for offloading data traffic in a wireless communication system, and more particularly, to a method and apparatus for supporting data traffic offloading in a wireless communication system including a distributed Packet Data Network (PDN) Gateway (P-GW).

BACKGROUND

The emergence and spread of smart phones and the rapid growth of the penetration rate of smart phones can lead to a new trend in the field of information and communication. With the activation of large-volume multimedia Applications (Apps) based on smart phones, the demand for mobile Internet traffic can be expected to increase every year and the interest in technologies for supporting a distributed gateway for efficiently processing the mobile Internet traffic in a Long Term Evolution (LTE)/Evolved Packet Core (EPC) network can also be expected to increase.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and apparatus for offloading data traffic in a wireless communication system.

Various aspects of the present disclosure provide a method and apparatus for supporting data traffic offloading in a wireless communication system including a distributed P-GW.

Various aspects of the present disclosure provide a method and apparatus for extending a system by offloading a centralized mobility anchor in a wireless communication system.

Various aspects of the present disclosure provide a method and apparatus for reducing traffic load by offloading data traffic centralized in a core network in a wireless communication system.

Various aspects of the present disclosure provide a method and apparatus for supporting a distributed P-GW with the smallest change in an LTE/System Architecture Evolution (SAE) network structure.

Other objects to be provided in the present disclosure may be understood by embodiments described below.

In a first example, a method for offloading data traffic by a Mobility Management Entity (MME) in a wireless communication system is disclosed. The method includes determining a Packet Data Network (PDN) to connect to for providing a service requested by a User Equipment (UE). The method also includes upon receiving a connection request message requesting connection between the UE and the PDN from the UE, selecting a gateway disposed closest to a Radio Access Network (RAN). The method further includes sending a permit message permitting a request for connection between the UE and the PDN to the UE. The method includes setting an Evolved Packet Service (EPS) bearer for transmission and reception of data traffic related to a service requested by the UE between the UE and the gateway.

In a second example, a method for offloading data traffic by a User Equipment (UE) in a wireless communication system is disclosed. The method includes sending a connection request message requesting connection with a Packet Data Network (PDN) to a Mobility Management Entity (MME) in which the UE is registered. The method also includes receiving a permit message permitting a request for connection between the UE and the PDN from the MME. The method further includes setting a gateway disposed closest to a Radio Access Network (RAN) and an Evolved Packet Service (EPS) bearer for transmission and reception of data traffic.

In a third example, a Mobility Management Entity (MME) for offloading data traffic in a wireless communication system is disclosed. The MME includes a receiver configured to receive a connection request message requesting connection between a User Equipment (UE) and a Packet Data Network (PDN) from the UE. The MME also includes a controller configured to determine a PDN to which to connect for providing a service requested by the UE upon receiving the connection request message, select a gateway disposed closest to a Radio Access Network (RAN), send a permit message permitting a request for connection between the UE and the PDN to the UE, and set an Evolved Packet Service (EPS) bearer for transmission and reception of data traffic related to a service requested by the UE between the UE and the gateway. The MME further includes a transmitter configured to send a permit message permitting a request for connection between the UE and the PDN to the UE.

In a fourth example, a User Equipment (UE) for offloading data traffic in a wireless communication system is disclosed. The UE includes a transmitter configured to send a connection request message requesting connection with a Packet Data Network (PDN) to a Mobility Management Entity (MME) in which the UE is registered. The UE also includes a receiver configured to receive a permit message permitting a request for connection between the UE and the PDN from the MME. The UE further includes a controller configured to set a gateway disposed closest to a Radio Access Network (RAN) and an Evolved Packet Service (EPS) bearer for transmission and reception of data traffic.

Other aspects, advantages, and salient features of the disclosure will become apparent to those skilled in the art from the following detailed description, which, taken in conjunction with the annexed drawings, discloses an exemplary embodiment of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. Hereinafter, operating principles of preferred embodiments of the present disclosure will be described in detail with reference to the attached drawings. In the following description, detailed descriptions of related known elements or functions that may unnecessarily make the gist of the present disclosure obscure will be omitted. The terms described later in the present specification are defined in consideration of functions in the present invention and may vary depending on the intention or usage of a user or an operator. Therefore, the terms should be defined based on the overall content of the present specification.

LTE/EPC networks can have characteristics of a centralized scheme based on a hierarchical network structure using a central PDN Gateway (P-GW) as a mobility anchor, but with the centralized scheme, the rapidly increasing demand for mobile Internet traffic can be difficult to handle. There is a need for distributing data traffic centralized on the central P-GW to reduce traffic load, increasing the traffic carrying capacity of a core network, and reducing a transmission cost. A traffic offload technology may be, for example, a Rel-9 femto cell offload technology, an Internet Protocol (IP) Selected IP Traffic Offload (SIPTO) of Rel-10, or the like.

An LTE/EPC network can establish a connection between a User Equipment (UE) and a PDN and can support an IP data service. A connection point between the PDN and the LTE/EPC network can be generally a P-GW positioned in the center of the core network. The P-GW can serve as a mobility anchor between an EPG of a 3GPP access system and a PDN of a non-3GPP access system.

Upon accessing the LTE/EPC network, the UE can be assigned with an IP address from the P-GW to establish connection with one PDN. The UE can simultaneously establish connection with several PDNs and can be assigned a new IP address from the P-GW for connection with each PDN. In the LTE/EPC network, the UE can establish a connection with a PDN for supporting various types of services and can transmit and receive data packets to and from the PDN by using a General Packet Radio Service (GPRS) Tunneling Protocol (GTP). An IP packet transmitted from the UE can be transmitted to the PGW across an evolved NodeB (eNodeB) and a Serving Gateway (S-GW) through a GTP tunnel.

Transmission through the GTP tunnel can mean transmitting an IP packet of the UE to the PGW through the eNodeB at all times regardless of a destination IP address of the IP packet. A data packet transmitted from the PDN can be transmitted to the PGW through the IP network and then can be transmitted to the UE through the GTP tunnel in the LTE network.

In the LTE/EPC network, a centralized mobility management technology can be used in which mobility of the IP packet or a data packet is managed based on the GTP tunnel and a central P-GW is used as a mobility anchor. However, the centralized mobility management technology can have problems that traffic is centralized in an anchor node such as a P-GW, causing a system scalability problem, a traffic routing path is non-optimized and does not match a flat-evolving mobile communication network in terms of a structure, a Single Point Of Failure (SPOF) occurs, and network resources are wasted.

The 3GPP organization, which is working on standardization of the LTE/EPC network, has recently standardized a Local IP Access (LIPA) technology and an SIPTO technology to solve weak points of centralized mobility management technologies. However, the SIPTO technology can be designed to use the existing LTE/EPC network structure and additionally process only selected data traffic (for example, web traffic) through a Local Gateway (LGW). As a result, the L-GW can have no direct interface with a Mobility Management Entity (MME) that performs a core function of signal processing in the LTE/EPC network and a Policy Charging and Rules Function (PCRF) that manages signaling processing related to billing and Quality of Service (QoS).

In the embodiments to be described below, data traffic may not pass through a centralized mobility anchor, that is, a P-GW. Instead, a function of the mobility anchor can be distributed to a place close to a RAN according to movement of a User Equipment (UE) to deliver data traffic through an optimal path. Also, data traffic concentrated in the center of a core network can be distributed to an edge of the core network, thereby increasing a data traffic carrying capacity of the core network and reducing a transmission cost. The embodiment to be described below can also support a distributed P-GW structure with the smallest change in an LTE/SAE network structure including an UE.

While a scheme for supporting a distributed P-GW in an LTE communication system will be described herein, the scheme for supporting the distributed P-GW can also be equally applied to any other communication system.

Figure 1:
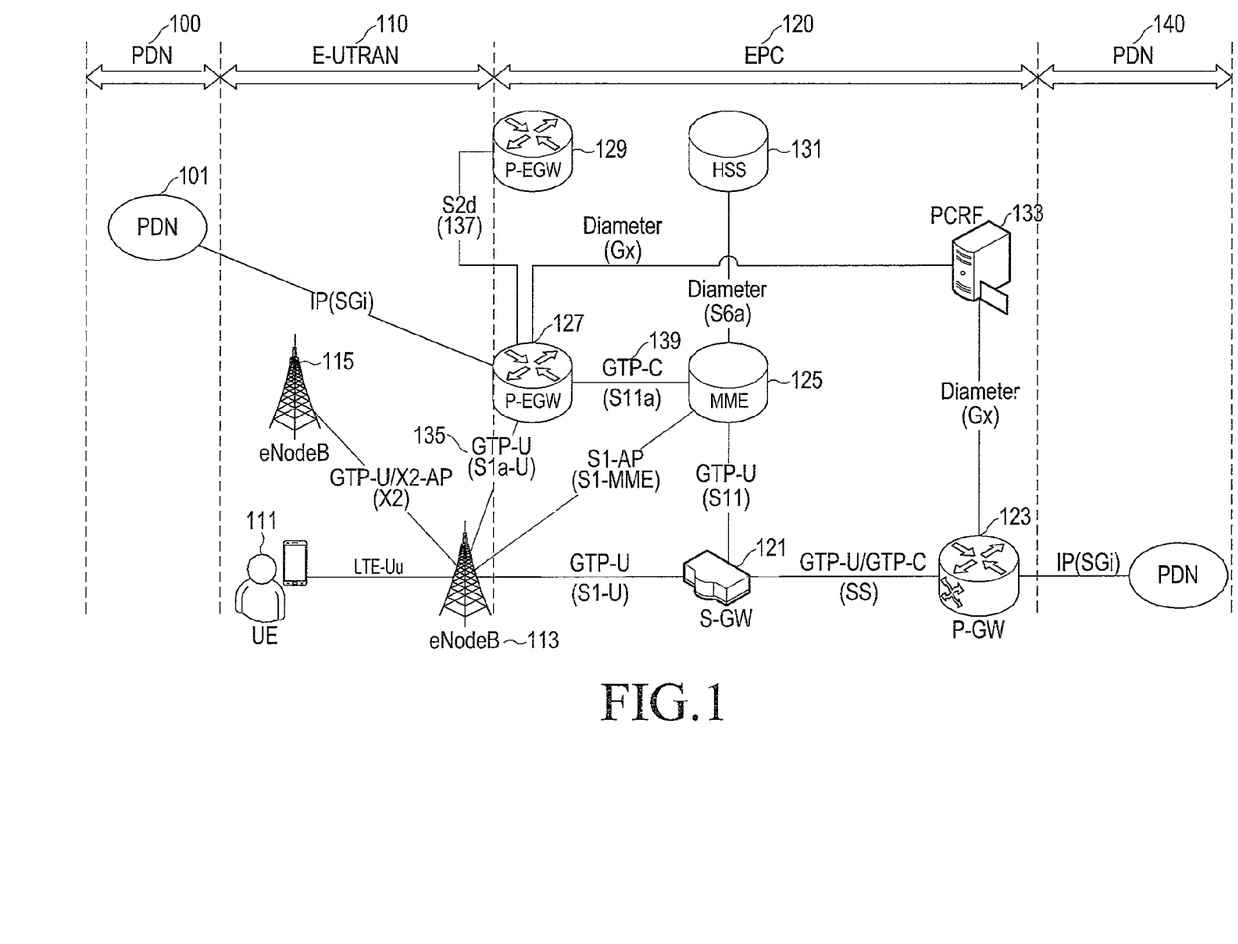
FIG. 1 illustrates an example network structure of an evolving packet system supporting a distributed P-GW according to this disclosure.

FIG. 1 illustrates an example network structure of an evolving packet system supporting a distributed P-GW according to this disclosure.

Referring to FIG. 1, an Evolved Packet System (EPS) can include a PDN 100, an Evolved-Universal Terrestrial Radio Access Network (E-UTRAN) 110, an Evolved Packet Core (EPC) 120, and a PDN 140. The E-UTRAN 110 can include a UE 111, and eNodeBs 113 and 115, and the EPC 120 can include an S-GW 121, a P-GW 123, a MME 125, PDN-EdgeGateways (P-EGWs) 127 and 129, a Home Subscriber Server (HSS) 131, and a PCRF 133.

The P-EGWs 127 and 129 can be functionally similar with the P-GW 123. However, the P-EGWs 127 and 129 can be different from the P-GW 123 in a sense that to reduce load generated by data traffic concentrated in the P-GW 123, the P-EGWs 127 and 129 are distributed over a position that is adjacent to an RAN, for example, a position of an eNodeB or a position adjacent to the eNodeB.

The P-EGWs 127 and 129 can support all functions of the P-GW 123 and the following functions of the S-GW 121. That is, upon receiving a data service from the PDN 101, the P-EGWs 127 and 129 request the UE 111 to open the data service, and when the UE 111 operates in an idle mode, the P-EGWs 127 and 129 can buffer packets included in the data service.

The P-EGWs 127 and 129 can maintain a SGi interface and a Gx interface that have been used for communication between the P-GW 123 and the PDN 101. The P-EGWs 127 and 129 can need a new interface for communication between an eNodeB 113 and the MME 125.

S1a-U interface 135 can be an interface between the eNodeB 113 and a P-EGW 127. S2d interface 137 can be an interface between the P-EGW 127 and a P-EGW 129. S11a interface 139 can be an interface between the P-EGW 127 and the MME 125

Figure 2:
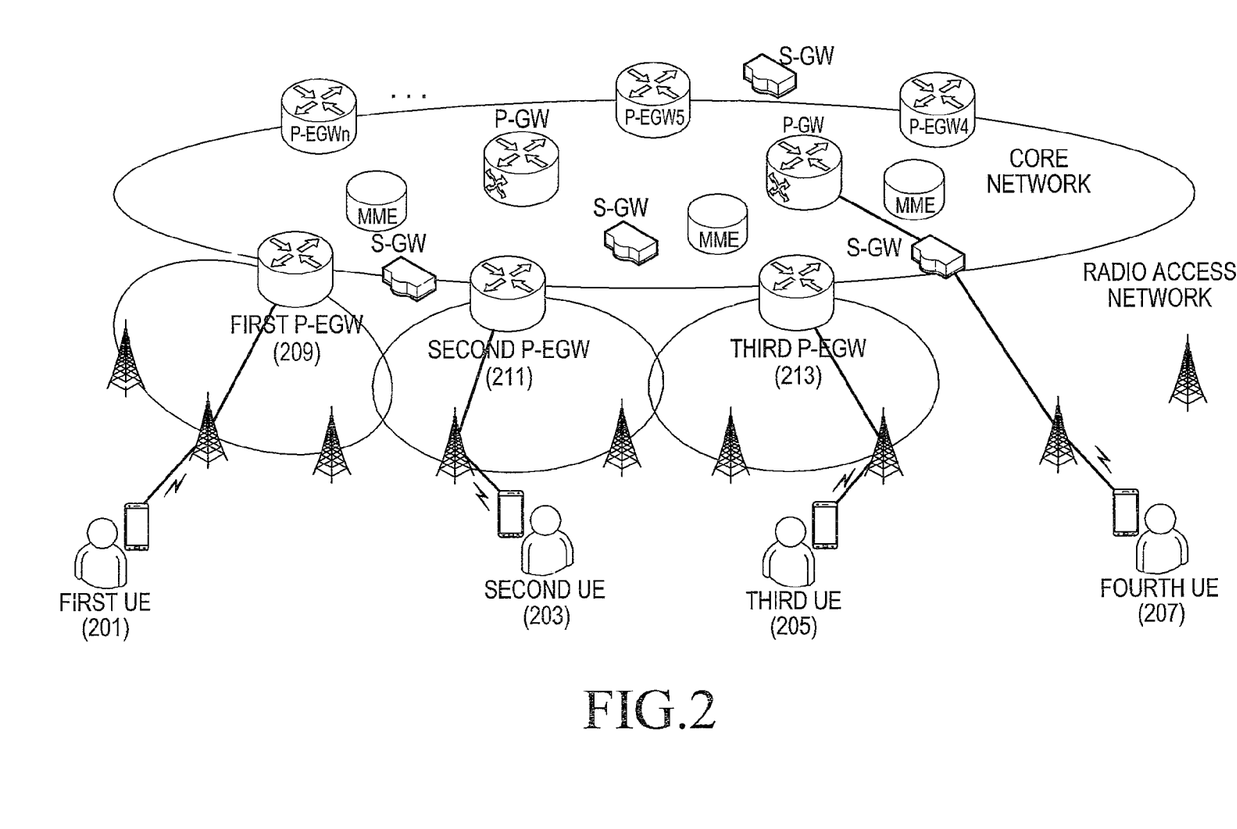
FIG. 2 illustrates an example in which a plurality of PEGWs are arranged in an EPS network according to this disclosure.

FIG. 2 illustrates an example in which a plurality of P-EGWs are arranged in an EPS network according to this disclosure.

Referring to FIG. 2, it can be assumed that in the EPS network, the P-EGW is used alone or both the P-GW and the P-EGW are used as mobility anchors for the UE. Thus, upon receiving a registration request and a service request from the UE, the MME can select one mobility anchor between the P-GW and the P-EGW for connection with the PDN and can perform a related procedure. The MME can then use a PDN service through the selected mobility anchor.

However, the P-EGW can have the same interface structure with another device as the function of the P-GW, such that both the P-EGW and the P-GW are arranged in a place the UE accesses, and the MME selects the P-EGW as a mobility anchor to improve the effect of reducing traffic load. However, if the P-EGW is not disposed in the place the UE accesses, then the MME can select the P-GW to provide a connection service between the UE and the PDN in the existing manner.

No interface exists between the P-EGW and the S-GW, and instead, the P-EGW can additionally support a function of the S-GW to interwork with a 3GPP network rather than the LTE/EPS network and to perform a heterogeneous handover function.

If a UE among first through fourth UEs 201, 203, 205, and 207 initially accesses the EPS network, the MME can perform a registration procedure with the EPS network to register the UE in the EPS network. EPS Connection Management (ECM) connection formed at that time between the UE and the MME can be used for a signaling service associated with registration and authentication of the UE. Thereafter, if the UE requests the MME to provide a service, the MME can preferentially select a P-EGW from among first through third P-EGWs 209, 211, and 213 disposed in a distributed manner, and can establish a connection between the UE and the PDN through the selected P-EGW. Thus, the UE can receive a service data provided from the PDN through the selected P-EGW. In this case, since the UE has already performed acquisition of an International Mobile Subscriber Identity (IMSI), authentication, and Non-Access Stratum (NAS) security establishment with the P-GW through the registration procedure, the UE can establish a connection with the PDN by performing an EPS session establish procedure with the P-EGW for data communication.

The UE can establish a connection with several PDNs at the same time through a plurality of P-EGWs, and the UE can be assigned a new IP address for connection with each PDN. That is, the UE that establishes connection with K PDNs can be assigned with K IP addresses. Herein, if connection is established with a PDN through a P-GW, an existing EPS system can be employed.

Figure 3:
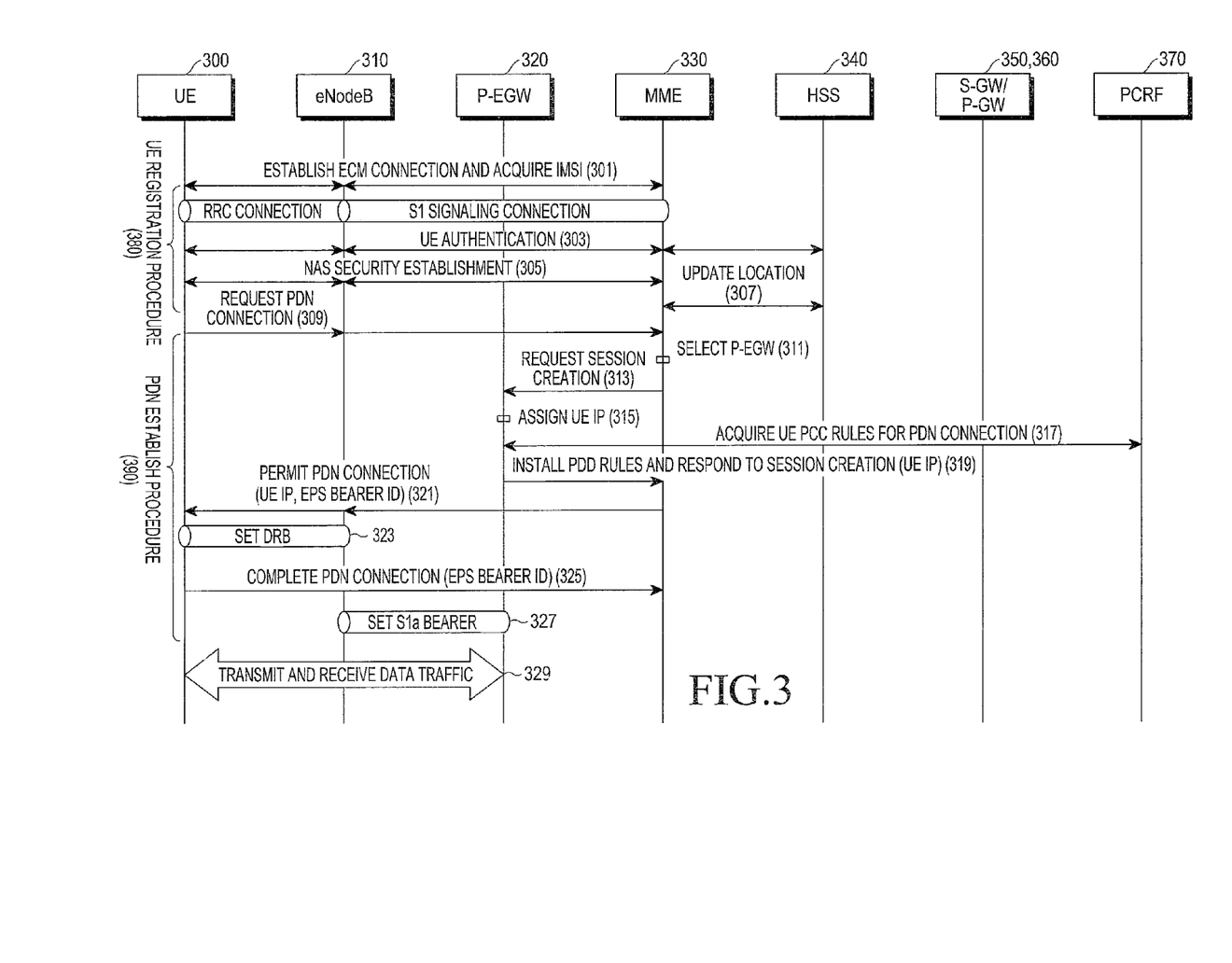
FIG. 3 is a ladder diagram illustrating an example of a registration procedure and a PDN connection establish procedure in a UE according to this disclosure.

FIG. 3 is a ladder diagram illustrating an example of a registration procedure and a PDN connection establish procedure in a UE according to this disclosure.

Referring to FIG. 3, an EPS network can include a UE 300, an eNodeB 310, a P-EGW 320, a MME 330, a HSS 340, an S-GW 350/P-GW 360, and a PCRF 370.

First, a UE registration procedure 380 is as described below.

The UE 300 can establish an ECM connection with the MME 330 for a control plane and can acquire an IMSI in operation 301. In an embodiment, with respect to the operation of acquiring the IMSI, the UE 300 an Attach Request message including the IMSI to the MME 330 to request network connection and the MME 330 can acquire the IMSI from the Attach Request message.

The UE 300 can perform an UE authentication procedure with the MME 330 by using the IMSI in operation 303. The MME 330 can perform an NAS security establish procedure to stably transmit an NAS message between the UE 300 and the MME 330 in operation 305.

The MME 330 can register the UE 300, and can perform a location update procedure with the HSS 340 to recognize which service the UE 300 may use in operation 307. That is, the MME 330 can inform the HSS 340 that the UE 300 is located in an area managed by the MME 330, and acquires user subscription information from the HSS 340.

A PDN connection establish procedure 390 is as described below. The UE 300 can sends a PDN connection request message to the MME 330 in operation 309, and the MME 330 can selects a P-EGW in operation 311. That is, the MME 330 can assign an EPS bearer Identifier (ID) for a service request of the UE 300, and can determine which PDN to connect to and through which P-EGW to connect to the PDN for the requested service of the UE 300. The MME 330 can determine a P-EGW, considering an Access Point Name (APN) set in the UE 300, (location-based) a closeness to the eNodeB 310 that manages the UE 300, a traffic load of a related P-EGW, and information indicating whether connection of the related P-EGW to the determined PDN is possible. As disclosed herein, it can be assumed that the MME 330 selects the P-EGW 320 through a P-EGW selection procedure of operation 311.

The MME 330 can send a session creation request message requesting EPS session creation to the selected P-EGW 320 in operation 313, and the P-EGW 320 having received the session creation request message can assign an IP address to the UE 300 in operation 315. The IP address to be assigned to the UE 300 can be, in terms of a phase, a correct address to which the P-EGW 320 can be routed for correct communication with the PDN. Each P-EGW can manages an IP pool, select an IP address necessary for PDN connection from among IP addresses included in the IP pool, and assign the IP address to the UE.

The P-EGW 320 can acquire UE Policy and Charging Control (PCC) rules from the PCRF 370 in operation 317. That is, the P-EGW 320 can inform the PCRF 320 of EPS session establishment of the UE 300 and can acquire the PCC rules from the PCRF 370 to perform resource assignment and policy control such as QoS control according to a service to which the UE 300 subscribes, in creating an EPS session for PDN connection.

The P-EGW 320 can install the PCC rules acquired from the PCRF 370 to apply the PCC rules to the EPS session of the UE 300. The P-EGW 320 can send a session creation response message confirming that the EPS session is created to the MME 330 in operation 319. The session creation response message can include QoS information applied to the EPS session and a default EPS bearer, and the session creation response message can be sent together with Uplink (UL) S1a P-EGW Tunnel Endpoint Identifier (TEID) information assigned to create an S1a GTP tunnel. The P-EGW 320 can send the IP address assigned in operation 315 to the MME 330.

After confirming that resource assignment for the UE 300 is permitted and assigned, the MME 330 can determine resources necessary for creation of a Data Radio Bearer (DRB) and an S1a bearer and information necessary for NAS signaling. The MME 330 can send a PDN connection permit message including the DRB, a resource necessary for creation of the S1a bearer, and information necessary for NAS signaling to the UE 300 in operation 321. That is, the MME 330 can transmit information necessary for setting the DRB between the UE 300 and the eNodeB 310, and the eNodeB 310 can set the DRB with the UE 300 based on the received information in operation 323. The MME 330 can deliver the IP address delivered from the P-EGW 320 and the EPS bearer ID assigned in operation 311 to the UE 300 through the eNodeB 310.

The UE 300 having completed DRB setting in operation 323 can send a PDN connection complete message indicating completion of PDN connection to the MME 330 in operation 325. The UE 300 can deliver the EPS bearer ID delivered from the MME 330 to the MME 330. The UE 300 can set the S1a bearer between the eNodeB 310 and the P-EGW 320 through the MME 330 in operation 327, and the UE 300 can set a data traffic path with the P-EGW 320 to transmit and receive data traffic in operation 329.

Figure 4A:
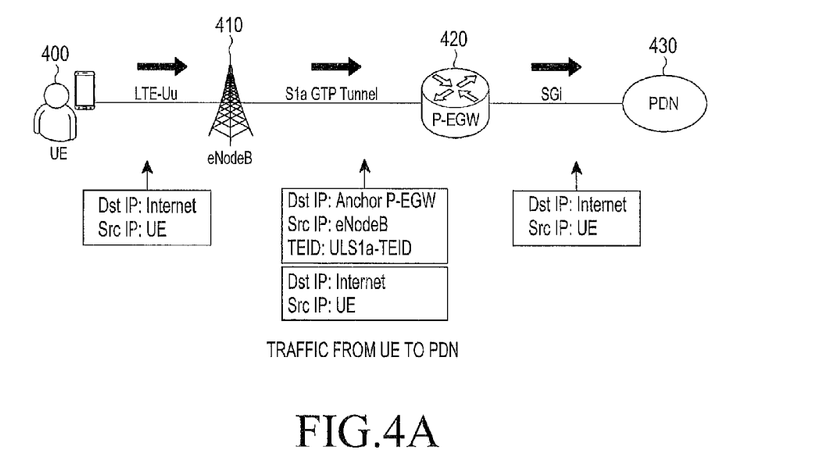
FIGS. 4A and 4B illustrate an example of transmitting and receiving data traffic through a PEGW according to this disclosure.
Figure 4B:
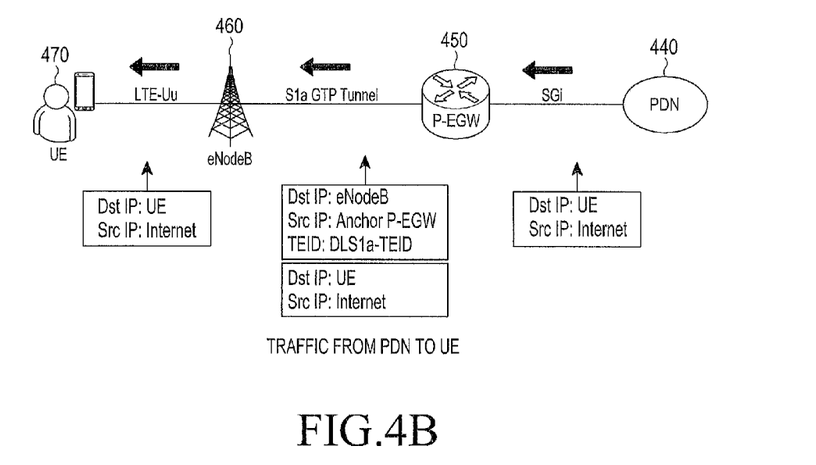

FIGS. 4A and 4B illustrate examples of transmitting and receiving data traffic through a P-EGW according to this disclosure.

Referring to FIGS. 4A and 4B, FIG. 4A illustrates an example of transmitting data traffic from a UE 400 to a PDN 430, and FIG. 4B illustrates an example of transmitting data traffic from a PDN 440 to a UE 470.

In FIG. 4A, the UE 400 can set a Source (Src) IP address of an IP packet as a UE address, set a Destination (Dst) IP address as an Internet address, and transmit the IP packet to an eNodeB 410 in a wireless interval. The IP packet can include [IP header][IP payload] in that order.

The eNodeB 410 can add information for GTP tunneling, for example, the Dst IP address set as an anchor P-EGW address, the Src IP address set as the eNodeB address, and a TEID set as a ULS1a-TEID, in front of the IP packet received from the UE 400, and then can transmit the IP packet to which the information for GTP tunneling is added to the P-EGW 420 through the GTP tunnel. The IP packet to which the information for GTP tunneling is added can include [Outer IP header (Dst IP=P-EGW, Src IP=eNodeB)] [GTP header] [User Datagram Protocol (UDP) header][IP header][IP payload] in that order.

The P-EGW 420 can remove the information for GTP tunneling from the IP packet to which the information for GTP tunneling is added, which has been received from the eNodeB 410, to transmit the original IP packet the UE 400 has transmitted to the PDN 430. The IP packet can include [IP header] [IP payload] in that order.

Next, in FIG. 4B, the PDN 440 can set the Dst IP address of the IP packet as the UE address, set the Src IP address as the Internet address, and transmit the IP packet to the P-EGW 450 in a wireless interval. The IP packet can include [IP header][IP payload] in that order.

The P-EGW 450 can add information for GTP tunneling, for example, the Dst IP address set as an eNodeB address, the Src IP address set as an anchor P-EGW address, and a TEID set as a DL S1a-TEID, in front of the IP packet received from the PDN 440, and can transmit the IP packet to which the information for GTP tunneling is added to an eNodeB 460 through the GTP tunnel. The IP packet to which the information for GTP tunneling is added can include [Outer IP header (Dst IP=eNodeB, Src IP=P-EGW)][GTP header] [UDP header][IP header][IP payload] in that order.

The eNodeB 460 can remove the information for GTP tunneling from the IP packet to which the information for GTP tunneling is added, which has been received from the P-EGW 450, to transmit the original IP packet the PDN 440 has transmitted to the UE 470. The IP packet can include [IP header] [IP payload] in that order.

Figure 5:
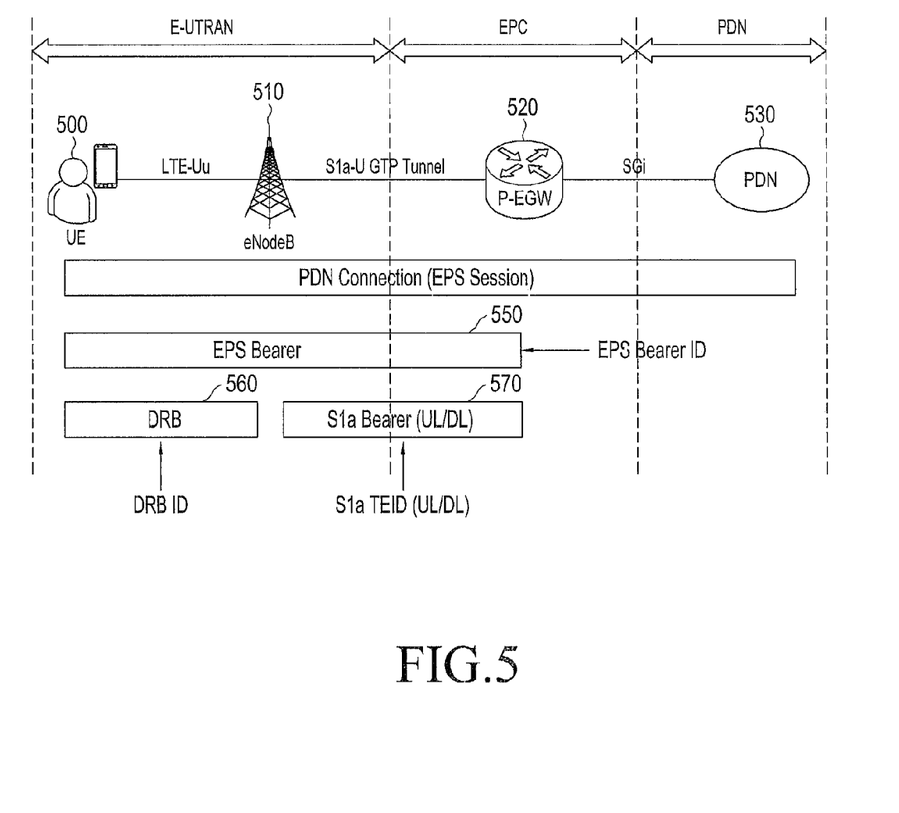
FIG. 5 illustrates an example of EPS session identification and a configuration of an EPS bearer according to this disclosure.

FIG. 5 illustrates an example of an EPS session identification and a configuration of an EPS bearer according to this disclosure.

Referring to FIG. 5, an EPS bearer 550 can be set in a traffic interval from a UE 500 to a P-EGW 520 during an EPS session and can include two sub-intervals, that is, a DRB 560 and an S1a bearer (UL/DL) 570.

That is, the DRB 560 that is set between the UE 500 and the eNodeB 510 can correspond to an LTE-Uu interface interval, which is a wireless interval, and user IP traffic can be transmitted through the DRB 560. The S1a bearer 570 that is set between the eNodeB 510 and the P-EGW 520 can correspond to the S1a-U interface interval, and the user IP traffic is transmitted through the GTP tunnel.

Figure 6:
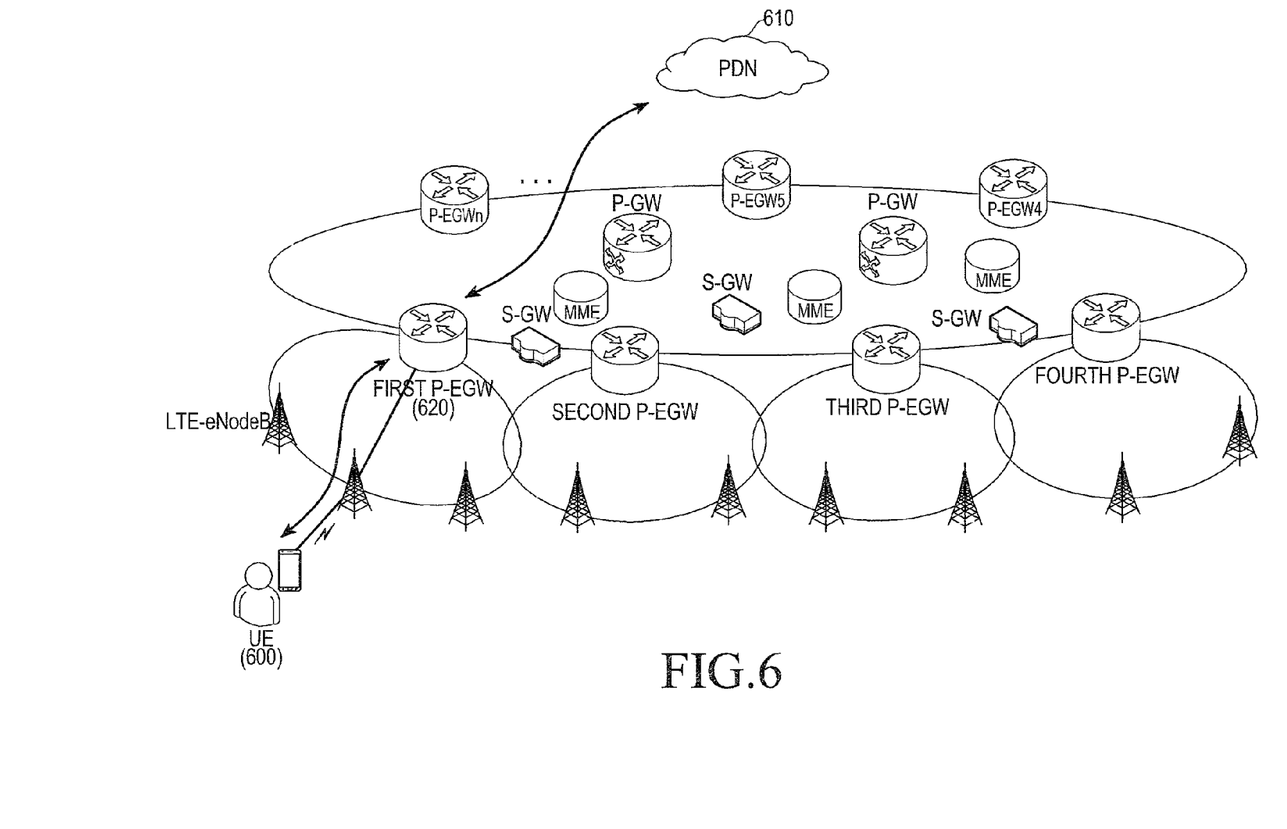
FIG. 6 illustrates an example data traffic delivery path and structure between an UE and a PDN according to this disclosure.

FIG. 6 illustrates an example data traffic delivery path and structure between an UE and a PDN according to this disclosure.

Referring to FIG. 6, a UE 600 can set a connection with a PDN 610 through a first P-EGW 620 rather than a P-GW, and can transmit and receive data traffic through set PDN connection. That is, the UE 600 can transmit data traffic to the first P-EGW 620 which then can deliver the data traffic to the PDN 610.

As such, the UE 600 can transmit and receive data traffic with the PDN 610 through first through fourth P-EGWs, rather than a P-GW, thus distributing data traffic concentrated in the P-GW and reducing traffic load.

Figure 7:
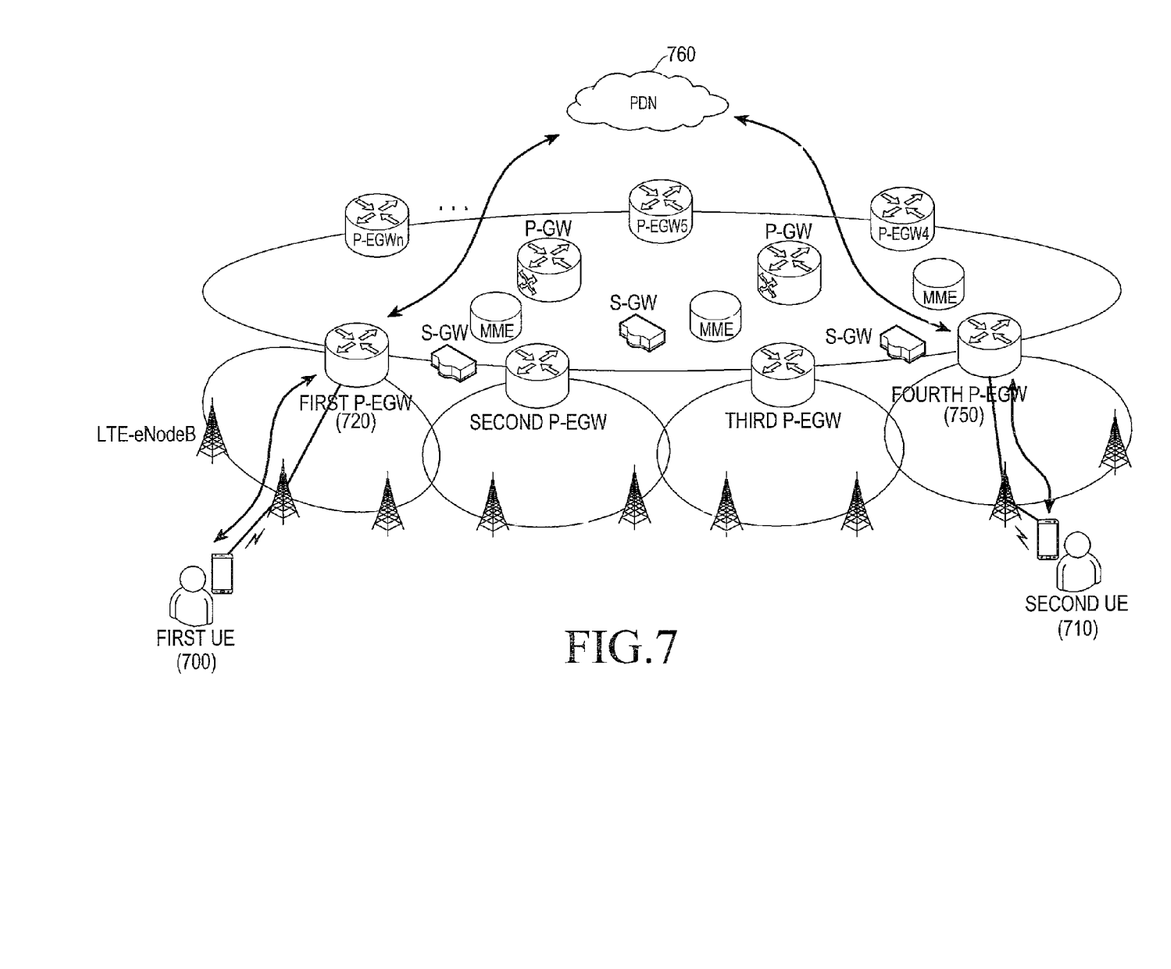
FIG. 7 illustrates an example data traffic delivery path and structure between a plurality of UEs and a PDN according to this disclosure.

FIG. 7 illustrates an example data traffic delivery path and structure between a plurality of UEs and a PDN according to this disclosure.

Referring to FIG. 7, a first UE 700 can transmit data traffic to a PDN 760 through a first P-EGW 720 that is close to an RAN to transmit and receive the data traffic to and from a second UE 710 in the same LTE network. Likewise, the second UE 710 can transmit the data traffic to the PDN 760 through a fourth P-EGW 750 that is close to the RAN.

The PDN 760, that is, an IP network managed by Internet Service Providers (ISPs), can deliver a data packet to the P-EGW of the UE by using a routing protocol managed by the PDN 760. Thus, the first UE 700 and the second UE 710 can transmit and receive a data packet transmitted and received therebetween through the PDN 760.

The UE can terminate a PDN connection if data exchange through PDN connection does not occur even after an elapse of a predetermined time during exchange of data traffic through PDN connection. That is, the P-EGW can set a timer to a preset time value to count a time in which no data traffic is generated for PDN connection. If no data traffic has been generated in an EPS session until the timer is expired, that is, during a preset time or more, the P-EGW can inform the MME, which is the main unit of the control plane, of the non-generation of the data traffic. Then, the P-EGW can release the ECM connection and the EPS session created for PDN connection and then can delete related information, thus terminating a PDN connection. Disclosed herein, a procedure for terminating PDN connection will be described in more detail with reference to FIG. 8.

Figure 8:
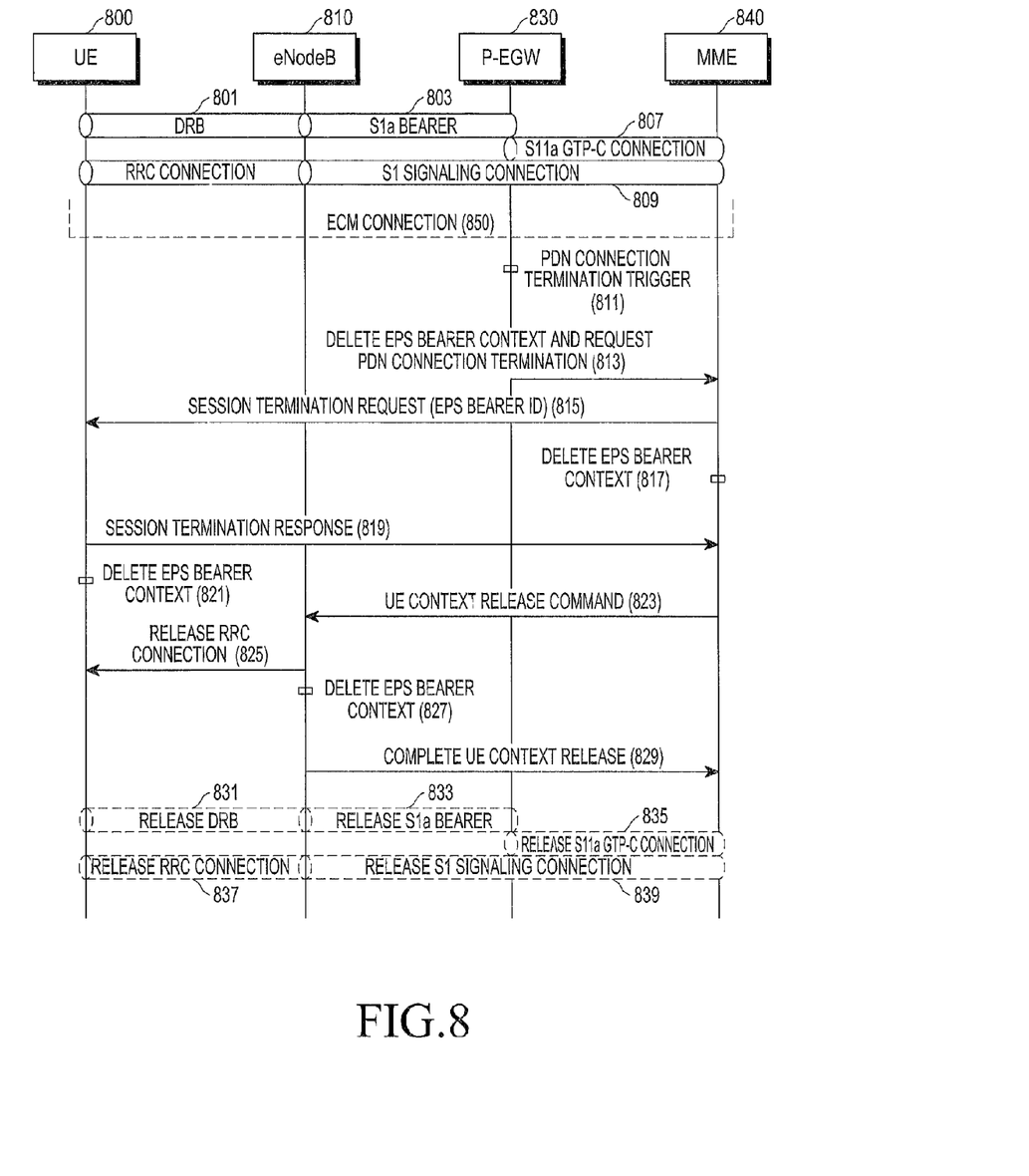
FIG. 8 is a ladder diagram illustrating an example of terminating PDN connection through a PEGW according to this disclosure.

FIG. 8 is a ladder diagram illustrating an example of terminating PDN connection through a P-EGW according to this disclosure.

Referring to FIG. 8, an EPS network can include a UE 800, an eNodeB 810, a P-EGW 830, and a MME 840. It can be assumed that a DRB 801 is set between the UE 800 and the eNodeB 810 and an S1a bearer 803 is set between the eNodeB 810 and the P-EGW 830. It can also be assumed that an ECM connection 850 is established between the UE 800 and the MME 840. The ECM connection 850 can include at least one of S11a GTP-C connection 807 established between the UE 800 and the eNodeB 810 and S1 signaling connection 809 established between the eNodeB 810 and the MME 840.

Once a PDN connection termination for certain PDN connection is triggered in operation 811, the P-EGW 830 can delete information related to the PDN connection, for example, an EPS bearer context and can send a PDN connection termination request message to the MME 840 in operation 813. In operation 811, the PDN connection termination can be triggered if no data traffic has been generated in a corresponding EPS session until a timer for counting a time during which any traffic is not generated in the PDN connection expires.

The MME 840 can send a session termination request message including an EPS bearer ID requesting session termination to the UE 800 through the eNodeB 810 in operation 815, and can delete an EPS bearer context that is information related to the PDN connection in operation 817. The UE 800 can send a session termination response message to the MME 840 in operation 819, and can delete the EPS bearer context that is the information related to the PDN connection in operation 821.

For termination of the ECM connection 850, the MME 840 can send a UE context release command message to the eNodeB 810 in operation 823 and the eNodeB 810 can send an RRC connection release message to the UE 800 in operation 825.

The eNodeB 810 can delete the EPS bearer context, which is the information related to the PDN connection, in operation 827, and can send a UE context release complete message to the MME 840 in operation 829.

Based on operations 811 to 829, the DRB 801 that is set between the UE 800 and the eNodeB 810 can be released in operation 831, the S1a bearer 803 that is set between the eNodeB 810 and the P-EGW 830 can be released in operation 833, and the ECM connection 850 can be released. That is, the S11a GTP-C connection 807 established between the P-EGW 830 and the MME 840 can be released in operation 835, and the RRC connection that is established between the UE 800 and the eNodeB 810 can be released in operation 837. In operation 839, the S1 signaling connection that is established between the eNodeB 810 and the MME 840 can be released.

The UE 800 having used the PDN service through the P-EGW 830 can operate in an idle mode according to a scheme applied in the EPS network structure. In this case, the DRB 801 and the S1a bearer 803 that are set for the UE 800 to receive the PDN service from the P-EGW 830 can be released. Thereafter, upon generation of data traffic that needs to be delivered from the PDN to the UE 800, the IP address of the UE 800 can be delivered to the P-EGW 830 according to a routing protocol of the PDN managed by the ISP. In this case, the P-EGW 830 can temporarily buffer the arriving data traffic and then can send a paging request message to the MME 840 to deliver the data traffic to the UE 800. The MME 840 can establish an EPS session again with the UE 800, and upon completion of establishment of a bearer for the EPS session, the P-EGW 830 can transmit the buffered data traffic to the UE 800. As disclosed herein, a procedure for paging a UE operating in the idle mode will be described in more detail.

Figure 9:
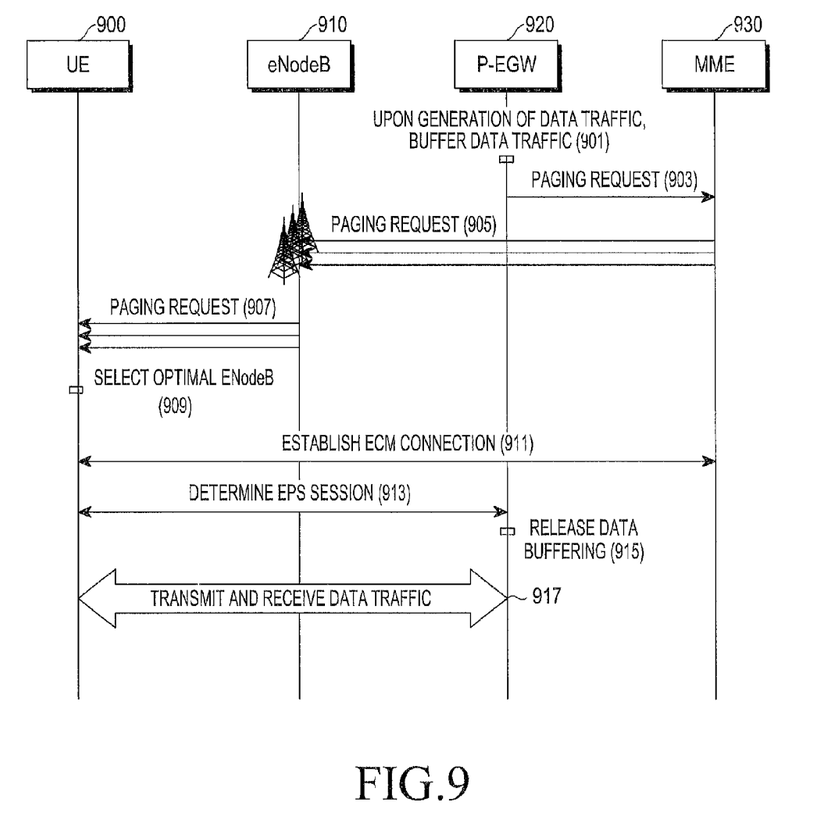
FIG. 9 is a ladder diagram illustrating an example of paging a UE through a PEGW according to this disclosure.

FIG. 9 is a ladder diagram illustrating an example of paging a UE through a P-EGW according to this disclosure.

Referring to FIG. 9, an EPS network can include a UE 900, an eNodeB 910, a P-EGW 920, and an MME 930, and the UE 900 can be assumed to operate in the idle mode.

If data traffic that has to be delivered to the UE 900 operating in the idle mode is generated, the P-EGW 920 can buffer the data traffic in operation 901. A reason why the P-EGW 920 buffers the data traffic can be that the UE 900 operates in the idle mode and thus a bearer for the EPS session is not set. The P-EGW 920 can buffer the data traffic until the bearer for the EPS session is set.

The P-EGW 920 can identify a location of the UE 900 operating in the idle mode and can send a paging request message to the MME 930 to establish the EPS session in operation 903. The MME 930 can send a paging request message to all eNodeBs included in a Tracking Area List (TAL) in operation 905, and each eNodeB having received the paging request message can broadcast the paging request message to the UE 900 in operation 907.

In operation 909, the UE 900 having received the paging request message can select an optimal eNodeB from among the eNodeBs having sent the paging request messages, taking a received signal strength and the like into account. The optimal eNodeB can mean an eNodeB to and from which the UE 900 is to transmit and receive a communication service, and the optimal eNodeB can be, for example, an eNodeB having the highest received signal strength. Herein, the optimal eNodeB can be assumed to be an eNodeB 910.

The UE 900 can establish an ECM connection between the UE 900 and the MME 930 through the selected optimal eNodeB and the UE 900 and the MME 930 can exchange a PDN connection request message and a PDN connection response message with each other in operation 911.

The MME 930 can establish an EPS session including a DRB that is set between the UE 900 and the eNodeB 910 and an S1a bearer that is set between the eNodeB 910 and the P-EGW 920 in operation 913. The P-EGW 920 can release data traffic buffering of operation 901 in operation 915, and the UE 900 and the P-EGW 920 can transmit and receive the buffering-released data traffic through the established EPS session in operation 917. That is, the P-EGW 920 can deliver the data traffic transmitted from the PDN to the UE 900 and can deliver the data traffic received from the UE 900 to the PDN.

Although not shown, a UE registration release process can be performed in an existing manner. For all PDN connections that are established through a P-EGW in the UE registration release process, the PDN connection termination procedure of FIG. 8 can be performed to terminate corresponding PDN connection.

In an embodiment, a P-GW can be disposed in a distributed manner to support a PDN service for a UE, thereby fundamentally solving a data traffic carrying problem or a system scalability problem. Moreover, by offloading the data traffic through the distributed P-GW, the data traffic carrying capacity of a core network can be increased and a transmission cost can be reduced.

While the present disclosure has been particularly illustrated and described with reference to exemplary embodiments thereof, various modifications or changes can be made without departing from the scope of the present disclosure. Therefore, the scope of the present disclosure should not be limited to the disclosed embodiment, and rather, should be defined by the appended claims and equivalents thereof.

The method and apparatus for offloading data traffic according to an embodiment of the present disclosure may be implemented in the form of hardware, software, or a combination of hardware and software. Such arbitrary software may be stored, whether or not erasable or re-recordable, in a volatile or non-volatile storage such as a Read-Only Memory (ROM); a memory such as a Random Access Memory (RAM), a memory chip, a device, or an integrated circuit; and an optically or magnetically recordable and machine (for example, computer)-readable storage medium such as a Compact Disc (CD), a Digital Versatile Disk (DVD), a magnetic disk, or a magnetic tape. It can be seen that the method and apparatus for offloading data traffic according to the present disclosure may be implemented by a computer or a portable terminal which includes a controller and a memory, and the memory is an example of a machine-readable storage medium which is suitable for storing a program or programs including instructions for implementing the embodiments of the present disclosure.

Therefore, the present disclosure includes a program including codes for implementing an apparatus or method claimed in an arbitrary claim and a machine (for example, computer)-readable storage medium for storing such a program. The program may be electronically transferred through an arbitrary medium such as a communication signal delivered through wired or wireless connection, and the present disclosure properly includes equivalents thereof.

The apparatus for offloading data traffic according to an embodiment of the present disclosure may receive and store the program from a program providing device connected in a wired or wireless manner. The program providing device may include a memory for storing a program including instructions for instructing the apparatus to execute the claimed method for offloading data traffic, information necessary for the method for offloading data traffic, a communication unit for performing wired or wireless communication with the apparatus, and a controller for transmitting a corresponding program to the apparatus at the request of the portable terminal or automatically.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for offloading data traffic by a mobility management entity (MME) in a wireless communication system, the method comprising:
    receiving a connection request message requesting connection between a user equipment (UE) and a packet data network (PDN) from the UE;
    determining a PDN for providing a service requested by the UE;
    selecting a PDN gateway based on a closeness between a location of the PDN gateway and a location of a base station (BS) that manages the UE;
    sending a permit message permitting a request for connection with the determined PDN to the UE through the BS;
    setting an evolved packet service (EPS) bearer for transmission and reception of data traffic related to the service between the UE and the PDN gateway;
    receiving a PDN connection termination request message sent from the PDN gateway if data traffic has not been transmitted or received through the EPS bearer for a preset time or more; and
    deleting a context related to the EPS bearer; and
    sending a session termination request message requesting deletion of the context related to the EPS bearer to the UE.

2. The method of claim 1, wherein the setting of the EPS bearer comprises:
    setting a data radio bearer (DRB) between the UE and the base station (BS) that manages the UE; and
    creating an S1a bearer between the BS and the PDN gateway.

3. The method of claim 1, further comprising:
    establishing EPS connection management (ECM) connection with the UE;
    acquiring an international mobile subscriber identity (IMSI) from the UE; and
    authenticating the UE by using the IMSI and registering the authenticated UE,
    wherein the connection request message is received from the registered UE.

4. The method of claim 1, further comprising:
sending a context release command message requesting deletion of the context related to the EPS bearer to the BS that manages the UE.

5. The method of claim 1, further comprising:
receiving a paging request message sent from the PDN gateway; and
paging a UE operating in an idle mode by sending the paging request message to all base stations (BSs) included in a tracking area list (TAL).

6. A method for offloading data traffic by a user equipment (UE) in a wireless communication system, the method comprising:
sending a connection request message requesting connection with a packet data network (PDN) to a mobility management entity (MME) in which the UE is registered;
receiving a permit message permitting a request for connection with the PDN from the MME;
setting a PDN gateway based on a closeness between the PDN gateway and a base station (BS) that manages the UE, and setting an Evolved Packet Service (EPS) bearer for transmission and reception of data traffic;
receiving a session termination request message sent from the MME if data traffic has not been transmitted or received through the EPS bearer for a preset time or more; and
deleting a context related to the EPS bearer.

7. The method of claim 6, wherein the setting of the EPS bearer comprises:
setting a data radio bearer (DRB) between the UE and the base station (BS) that manages the UE; and
creating an S1a bearer between the BS and the PDN gateway.

8. The method of claim 6, further comprising:
receiving a paging request message that is broadcast from all base stations (BSs) included in a Tracking Area List (TAL) if the UE operates in an idle mode; and
selecting a base station (BS) that is to transmit and receive the data traffic from among the BSs based on a received signal strength of the paging request message.

9. A Mobility Management Entity (MME) for offloading data traffic in a wireless communication system, the MME comprising:
a receiver configured to receive a connection request message requesting connection between a User Equipment (UE) and a Packet Data Network (PDN) from the UE;
a controller configured to determine a PDN for providing a service requested by the UE, to select a PDN gateway based on a closeness between a location of the PDN gateway and a location of a base station (BS) that manages the UE, and to set an evolved packet service (EPS) bearer for transmission and reception of data traffic related to the service between the UE and the PDN gateway; and
a transmitter configured to send a permit message permitting a request for connection with the determined PDN to the UE through the BS,
wherein the receiver is configured to receive a PDN connection termination request message sent from the PDN gateway if data traffic has not been transmitted or received through the EPS bearer for a preset time or more, to delete a context related to the EPS bearer, and to send a session termination request message requesting deletion of the context related to the EPS bearer to the UE.

10. The MME of claim 9, wherein the controller is configured to set a data radio bearer (DRB) between the UE and the base station (BS) that manages the UE and to create an S1a bearer between the BS and the PDN gateway.

11. The MME of claim 9, wherein the controller is configured to establish EPS connection management (ECM) connection with the UE, to acquire an international mobile subscriber identity (IMSI) from the UE, to authenticate the UE by using the IMSI and registering the authenticated UE, and to register the authenticated UE, in which the connection request message is received from the registered UE.

12. The MME of claim 9, wherein the transmitter is configured to send a context release command message requesting deletion of the context related to the EPS bearer to the BS that manages the UE.

13. The MME of claim 9, wherein the receiver is configured to receive a paging request message sent from the PDN gateway, and page a UE operating in an idle mode by sending the paging request message to all base stations (BSs) included in a tracking area List (TAL).

14. A user equipment (UE) for offloading data traffic in a wireless communication system, the UE comprising:
a transmitter configured to send a connection request message requesting connection with a packet data network (PDN) to a mobility management entity (MME) in which the UE is registered;
a receiver configured to receive a permit message permitting a request for connection with the PDN from the MME; and
a controller configured to set a PDN gateway based on a closeness between a location of the PDN gateway and a location of a base station (BS) that manages the UE, and set an Evolved Packet Service (EPS) bearer for transmission and reception of data traffic,
wherein the receiver is configured to receive a session termination request message sent from the MME if data traffic has not been transmitted or received through the EPS bearer for a preset time or more, and delete a context related to the EPS bearer.

15. The UE of claim 14, wherein the controller is configured to set a data radio bearer (DRB) between the UE and a base station (BS) that manages the UE and creates an S1a bearer between the BS and the PDN gateway.

16. The UE of claim 14, wherein the receiver is configured to receive a paging request message that is broadcast from all base stations (BSs) included in a tracking area list (TAL) if the UE operates in an idle mode, and select a base station (BS) that is to transmit and receive the data traffic from among the BSs based on a received signal strength of the paging request message.

17. The method of claim 1, wherein the connection request message is received after a UE registration procedure.

18. The method of claim 6, wherein the connection request message is sent after a UE registration procedure.

19. The MME of claim 9, wherein the connection request message is received after a UE registration procedure.

20. The UE of claim 14, wherein the connection request message is sent after a UE registration procedure.

* * * * *